(12) United States Patent
Thudt

(10) Patent No.: US 7,423,969 B2
(45) Date of Patent: Sep. 9, 2008

(54) PROCESS FOR STORING TRANSMISSION UNITS AND A NETWORK COMMUNICATIONS DEVICE

(75) Inventor: Raimar Thudt, München (DE)

(73) Assignee: Infineon Technologies AG, Munich (DE)

( * ) Notice: Subject to any disclaimer, the term of this patent is extended or adjusted under 35 U.S.C. 154(b) by 636 days.

(21) Appl. No.: 10/967,081

(22) Filed: Oct. 14, 2004

(65) Prior Publication Data

US 2005/0157757 A1    Jul. 21, 2005

(30) Foreign Application Priority Data

Oct. 14, 2003    (DE) ................. 103 47 762

(51) Int. Cl.
*H04L 12/50* (2006.01)
(52) U.S. Cl. ............ 370/235; 370/429; 370/395.72; 370/412
(58) Field of Classification Search ............ 370/474, 370/466, 412, 379, 363, 368, 395.5, 395.72, 370/429, 235, 395.1, 395.7
See application file for complete search history.

(56) References Cited

U.S. PATENT DOCUMENTS

| | | | | |
|---|---|---|---|---|
| 5,809,024 A | * | 9/1998 | Ferguson et al. | 370/395.53 |
| 5,822,607 A | * | 10/1998 | Henry et al. | 712/32 |
| 6,522,667 B1 | * | 2/2003 | Oda et al. | 370/474 |
| 6,724,767 B1 | * | 4/2004 | Chong et al. | 370/412 |
| 6,807,617 B2 | * | 10/2004 | McGrath | 711/208 |
| 7,334,109 B1 | * | 2/2008 | Anvin et al. | 711/220 |
| 2003/0140196 A1 | * | 7/2003 | Wolrich et al. | 711/118 |

FOREIGN PATENT DOCUMENTS

| | | |
|---|---|---|
| DE | 100 48 072 A1 | 4/2001 |
| DE | 101 19 754 A1 | 10/2002 |
| DE | 102 42 321 A1 | 9/2003 |

* cited by examiner

*Primary Examiner*—Ricky Ngo
*Assistant Examiner*—DeWanda Samuel
(74) *Attorney, Agent, or Firm*—Maginot, Moore & Beck

(57) ABSTRACT

The present invention relates to a process for storing transmission units in interworking between networks of differing protocol structure, in particular between ATM networks and Ethernet networks, and a corresponding network communications device. In accordance with the invention a storage in a segmented memory (10) is proposed in which the segmentation is chosen in such a way that the length of a segment of the segmented memory (10) corresponds to the length of the payload of an ATM cell. The storage of transmission units in the segmented memory (10) is preferably effected in the form of lists (40) which comprise descriptor segments (100) and data segments (200). The invention facilitates efficient storage and processing of transmission units with differing data structure and length.

27 Claims, 6 Drawing Sheets

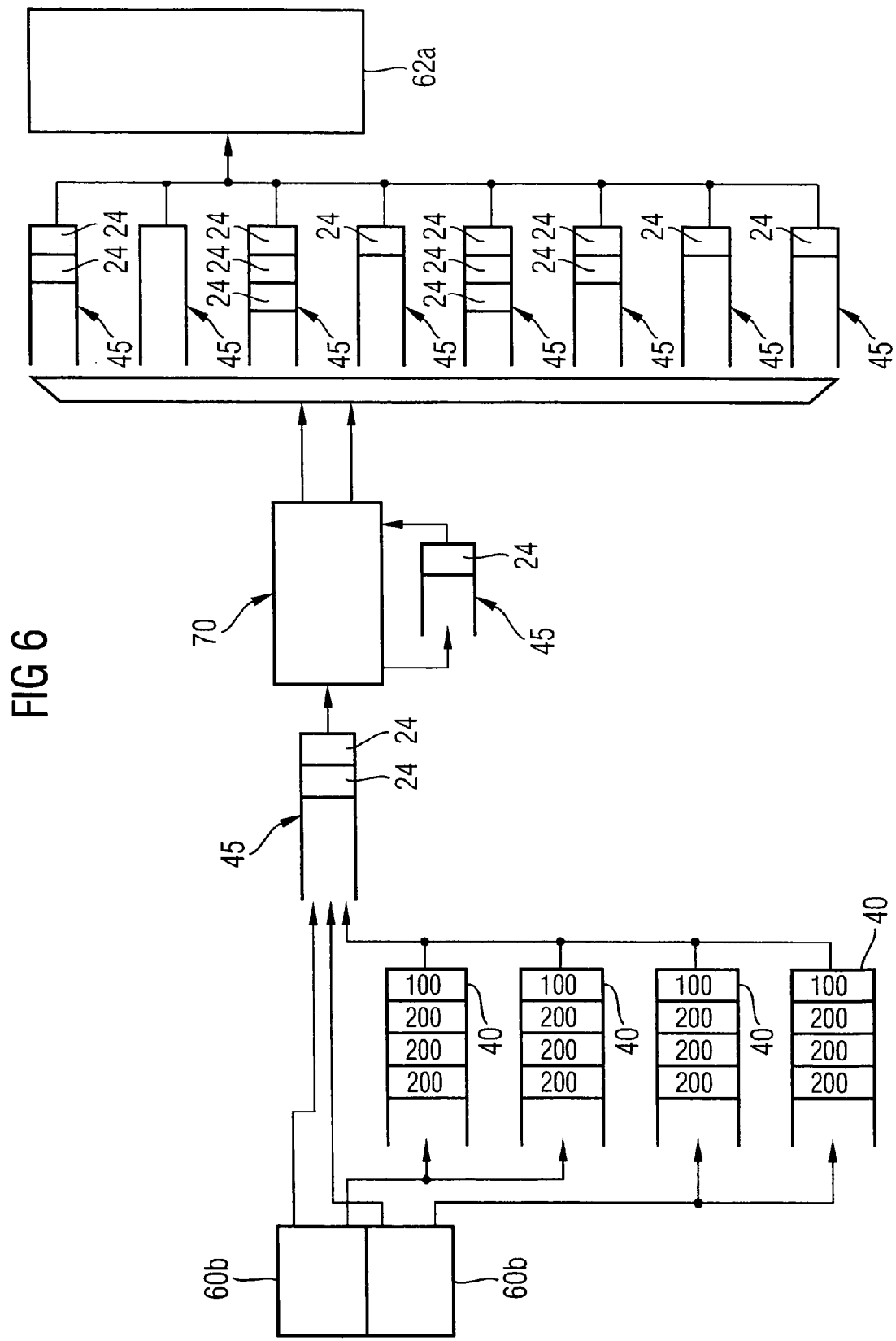

PROCESS FOR STORING TRANSMISSION UNITS AND A NETWORK COMMUNICATIONS DEVICE

FIELD OF THE INVENTION

The present invention relates to a process for storing transmission units during the transfer of data between networks with differing data structures of transmission units used therein and to a corresponding network communications device. The networks can be in particular an ATM network and an Ethernet network.

BACKGROUND

To achieve so-called interworking, i.e. a transfer of data between networks with differing protocol structures, particularly between ATM networks and Ethernet networks, it is necessary to adapt the data flow and/or the data structure of transmission units between the network protocols concerned. ATM network protocols provide for data to be transmitted in transmission units in the form of ATM cells with a fixed length. An ATM cell comprises a header section and a payload section, in which the header section contains administrative information. The data charge itself is contained in the payload section. ATM networks usually use payload sections of 48 bytes. Adaptation protocol layers which provide the transition to higher level protocols, e.g. AAL5 (ATM Adaptation Layer 5), provide for several ATM cells to be joined together into higher level transmission units. The higher level transmission units have no fixed length. The higher level transmission units are broken down into ATM cells for transmission and reassembled after transmission, i.e. brought back together.

In Ethernet networks, e.g. fast Ethernet networks or gigabit Ethernet networks the data is transmitted in transmission units in the form of Ethernet frames. The Ethernet frames may have variable length, typically greater than the length of the ATM cells described above.

For interworking, for example between an ATM network and an Ethernet network it is therefore necessary to adapt the data structures of the transmission units between the network protocols involved. This means that transmission units of one network protocol with a specific characteristic length have to be converted into transmission units of the other network protocol, whereby the transmission units of the other network may have a different length, which may vary from transmission unit to transmission unit. In the opposite direction, transmission units of the other network protocol have to be converted into transmission units of the first network protocol. In addition, the concatenation of transmission units into higher level transmission units has also to be taken into account in the conversion process. This conversion is generally carried out by a corresponding electronic storage and processing of the transmission units, which is associated with considerable effort. This is also associated with a correspondingly complex structure of an interworking device used for this purpose, e.g. in the form of a semiconductor network communications component.

It is an object of the present invention therefore to provide a process for the storage of transmission units and a corresponding network communications device which will solve the problem described above and particularly enable efficient storage and processing of the transmission units of various network protocols.

This object is achieved by a process according to embodiments of the present invention and by a network communications device according to embodiments of the invention.

SUMMARY

The present invention serves the transfer of data between a first network and at least one further network in the form of transmission units which in a payload section contain the data to be transferred. The first network uses transmission units which have payload sections that are the same length for each transmission unit. This network may be in particular an ATM network with transmission units or cells that have a payload section with a length of 48 bytes. According to the process in accordance with the invention, the transmission units are stored in a segmented memory which is segmented in such a way that the length of a segment corresponds to the length of the payload section of the transmission units in the first network. The segmented memory is preferably capable of being addressed by memory addresses. In addition, the first network can also use higher level transmission units formed from combining the transmission units named above. The second network may in particular be an Ethernet network, with transmission units formed from Ethernet frames.

The transmission units are preferably stored in the segmented memory in the form of lists, where each list comprises at least a descriptor segment to describe a data structure of the corresponding transmission unit and the data of the transmission unit are stored in at least one data segment. The descriptor segment is preferably a first element in the list. In particular, information from a header section of the transmission unit placed ahead of the payload section or information from a trailer section located after the payload section can be inserted into the descriptor segment. The description of the transmission unit's data structure in the descriptor segment may in particular be used when processing the header section of the transmission unit. For this purpose, for example, a memory section, i.e. that part of the data segment, in the descriptor segment may be defined in which the header section of the transmission unit is stored.

The data structure of the transmission units is preferably described by fields in the descriptor segment. Into these fields for example a number of processing procedures for the transmission unit, the number of segments in the transmission unit, the length of the transmission unit, the type of transmission unit or memory addresses of specific segments in the transmission unit, e.g. of the data segment found at the end of the list, may be inserted.

In order to secure efficient processing of the transmission units stored in the segmented memory, it is advantageous to include further fields into the descriptor segment, which describe insert, replace or delete operations. For this purpose, these further fields can define a memory section within a data segment or a repeated execution of an operation on succeeding data segments on a list. If this is a read operation, it is easy to define a memory section which extends over several data segments in the list. In addition, additional data can be inserted into the further fields so that for example the transmission units can be supplemented during a processing operation. The function or the type of the further fields is preferably defined by a subfield of the further fields.

It is particularly advantageous to keep variable a number of the further fields in which at least one descriptor element of the list can be used, so that memory space is not used unnecessarily for unused functions. In this context it is particularly advantageous to mark the end of a sequence of used further fields with a specific type of further field in which there is at least one descriptor segment. Such a sequence of used further fields may if required extend across several descriptor segments.

It is also advantageous to connect the segments in the segmented memory to the lists by using a table memory. The table memory is addressable via memory addresses which correspond to the memory addresses of the segmented memory, and an entry in the table memory points to another entry in the table memory so that lists of entries of the table memory are formed, corresponding to the lists of segments in the segmented memory. A list of this kind of entries in the table memory can for example comprise the memory addresses of all segments of a transmission unit or the memory addresses of all unused or free segments in the segmented memory.

The storage of transmission units described above is particularly suited to use in a network communications device, e.g. for interworking between the ATM network and the Ethernet network. In a network communications device which stores the transmission units using the process described above, the transmission units can be stored in a particularly efficient manner and be efficiently processed to adapt their data structures. Thus, for example, processing of the header section of a transmission units can be done in a simple way by dividing into descriptor segments and data segments. The information inserted into the fields of the descriptor segment is of particular importance in this context.

There is a significant advantage in using lists to store transmission units, in particular with reference to transmission units which have no fixed length. Thus, the content of the transmission unit can be flexibly distributed over several data segments. Equally, several elementary transmission units which belong together of a higher level transmission unit, e.g. of a higher level AAL5 transmission unit which comprises several ATM cells, can be stored in a common list.

When adapting the data structure of the transmission units, it is particularly advantageous to use a processing based on pointers which point to the segments of a list so that there is only a movement of the pointers but not of the data in the segmented memory.

Further advantages of the present invention can be seen in the following detailed description.

In the following the invention will be described in more detail with reference to the embodiments described hereinafter.

Hereinafter, a preferred embodiment of the invention will be described in more detail with reference to the accompanying drawings.

BRIEF DESCRIPTION OF THE DRAWINGS

FIG. 6 shows the data flow from the Ethernet network to the ATM network in the network communication device according to the embodiment of the present invention.

DETAILED DESCRIPTION

Figure 1:
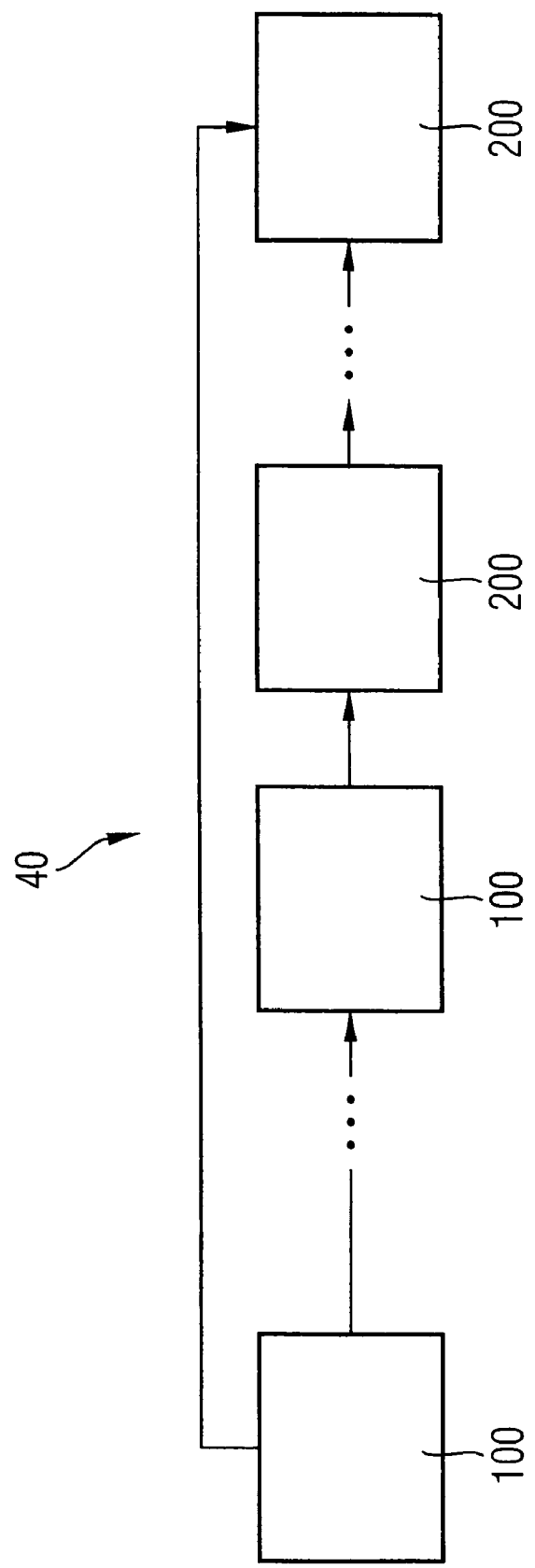
FIG. 1 is a schematic representation of the structure of a transmission unit in the form of a list of segments according to an embodiment of the present invention.

In FIG. 1 a list 40 of segments is shown by which a transmission unit is stored in a segmented memory, using a process according to the embodiment of the present invention. The segmentation of the segmented memory is selected in accordance with a length of the payload section of elementary transmission units in the form of ATM cells in an ATM network of 48 bytes. The list comprises descriptor segments 100 and data segments 200. The segments are stored in a segmented memory which is addressable by memory addresses. The first element in the list is a descriptor segment 100, which contains a reference to the memory address of a data segment 200 at the end of the list 40. The list may store an Ethernet frame, i.e. a transmission unit of an Ethernet network or an AAL5 transmission unit which is made up of several ATM cells. As the length of these transmission units exceeds the length of the segments in the segmented memory, they are stored in several data segments 200. Thus, the first data segment 200 of the list 40 may contain a header section of the Ethernet frame. Special information from the header section is inserted into the descriptor segments 100.

If the transmission unit is a AAL5 transmission unit which encompasses a trailer section which is placed after the payload section in the transmission unit, special information from this trailer section may be inserted into the descriptor segments 100.

The storage of a complete ATM cell including its header section with a length of 5 bytes and its payload section with a length of 48 bytes may for example be effected in a list consisting of a descriptor segment 100 and two data segments 200, the first of the data segments 200 containing the header section of the ATM cell. In this case, which memory section in the first data segment 200 is allocated to the header section, is defined in the descriptor segment 100.

Figure 2:
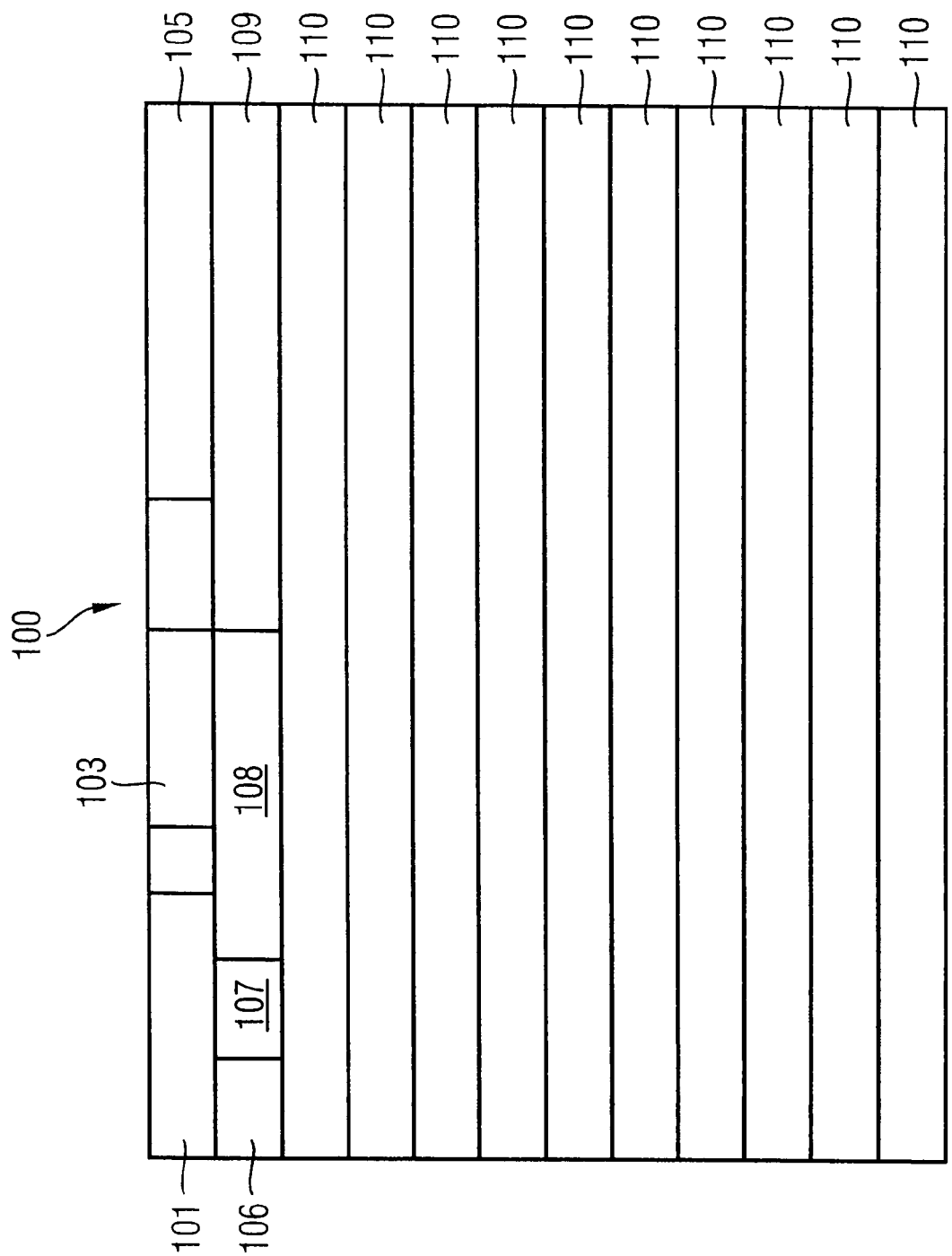
FIG. 2 is a schematic representation of the structure of a descriptor segment according to the embodiment of the present invention.

As shown in FIG. 2, the descriptor segments comprise fields 101, 103, 105, 106, 107, 108, 109, 110, which describe the data structure of the transmission unit in the segmented memory. Depending upon their function, the fields have differing numbers of bits or bytes.

An output enumerator field 101 describes a number of planned processing procedures for this descriptor segment 100 and the corresponding transmission unit. This is particularly advantageous in the case of so-called multicast procedures when for example multiple parallel output of a transmission unit is planned.

A segment enumerator field 103 describes the number of segments 100, 200 which the transmission unit in the segmented memory contains. A length field 105 describes the length of the transmission unit in bytes.

A status field 106 contains several subfields which indicate whether a further descriptor segment follows in the list and whether an error has occurred in the transmission unit. The errors can be for example checksum errors, a maximum permissible transmission unit length being exceeded or a memory overflow error.

A type field 107 describes the type of transmission unit. transmission units can be of AAL5 protocol for an EoA (Ethernet over ATM), i.e. to send Ethernet frames over the ATM network, Ethernet frames, PTM transmission units (PTM=packet transport mode), AoE transmission units, i.e. ATM cells encapsulated in Ethernet frames, or administration cells filtered out from an EoA flow, so-called AOM cells. The AoE transmission units and the EoA transmission units are of particular importance for ATM-Ethernet interworking.

A connection identification field 108 serves to identify the transmission units in connection with an individual connection allocation. A memory address field 109 contains the memory address of the data segment at the end of the list and thus defines the end of the list.

The descriptor segment 100 also contains ten further fields 110 whose function or type is defined in each case by a subfield contained within each one. The number of the further fields 110 used in one of the descriptor segments 100 is variable, i.e. these fields are optional. A sequence of used further fields 110 is terminated by a specific further field 110 whose function is defined as end field by the subfield contained within it, i.e. this type of the variable fields 110 marks the end of the sequence. If in one of the descriptor segments 100 no features of the transmission unit to be defined via the further fields 110, a first of the further fields 110 is characterised as end field.

The further fields 110 may for example contain the memory address of a specified data segment 200 and therein define a memory section. This can be in particular header section to be modified during the adaptation of the data structure, which is stored in the defined data segment 200.

In addition, the further fields 110 can define a repeated execution of a specified operation on subsequent elements of a list 40. This can in particular be read operations. The field then contains the memory address of those data segments 200 which are located at the beginning of the memory section to be defined, and the number of repetitions, i.e. the number of segments on which the operation is to be carried out. In this way, using a repeated read operation enables a large memory section to be defined. This type of further fields 110 is particularly advantageous for defining a memory section which comprises several data segments 200, e.g. to define the memory section in which the payload section of an Ethernet frame is stored.

A further type of further fields 110 is used to record data to be used or inserted during a specified operation. These data can be data from the trailer section of AAL5 transmission units, which for example contain the length of an AAL5 transmission unit, so that when adapting the data structure of the AAL5 transmission unit no separate calculation of its length is necessary. This data may also be a so-called UUI field (user-user-indication field) from the trailer section of AAL5 transmission units. The latter is particularly advantageous as this data from the trailer section has to be passed on to higher protocol layers.

The fields 101, 103, 105, 106, 107, 108, 109, 110 of the descriptor segments 100 are used to describe the data structure of the corresponding transmission unit. The information contained therein is necessary for efficient processing during the adaptation of the transmission unit's data structure to a different network protocol. In this case, in particular the optional further fields 110 are used which describe insert, replace and erase operations.

In the event that the ten further fields 110 of the first descriptor segment 100 are not adequate to store the required information, it is provided that the corresponding list 40 contains further descriptor segments 100. The further descriptor segments 100 of the list differ solely by the further fields 110 of the first descriptor segment 100. A final descriptor segment 100 in the list 40 differs also in the subfield of the status field 106 which indicates whether further descriptor segments 100 follow in the list from the remaining descriptor segments 100 of the list.

Figure 3:
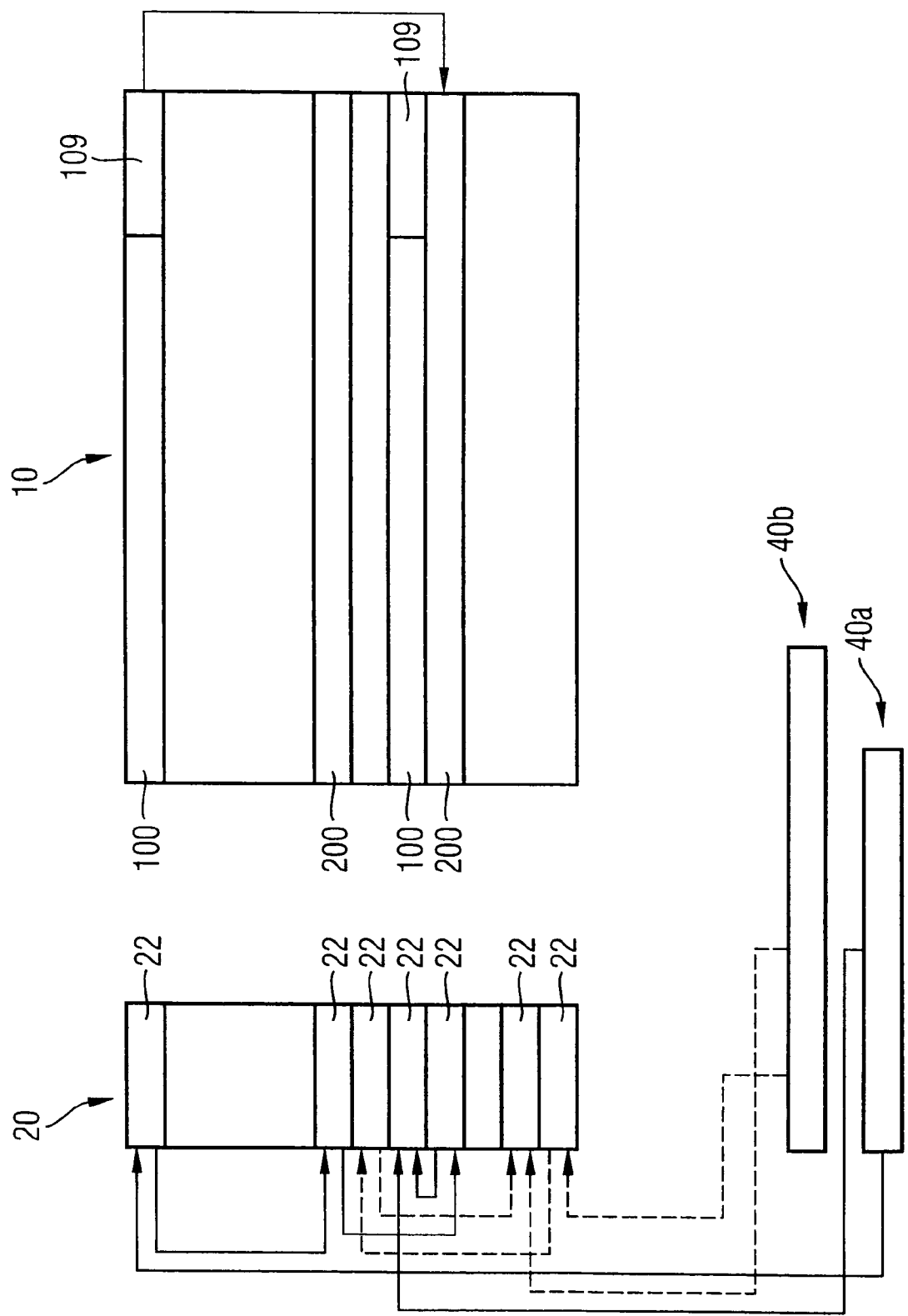
FIG. 3 is a schematic representation of the structure of a segmented memory, and a linkage of segments to lists in the segmented memory via a table memory according to the embodiment of the present invention.

FIG. 3 is a schematic representation of the structure of the segmented memory 10 and of the connection of segments in the segmented memory 10 through a table memory 20 of the lists 40. The segmented memory 10 shows two descriptor segments 100 and two data segments 200. The descriptor segments 100 and the data segments 200 belong to the same list 40. The first descriptor segment 100 contains the memory address of the data segment 200 in the memory address field 109 at the end of the list.

Entries 22 in a table memory 20 are addressable via the memory addresses of the segments on the segmented memory 19, which are allocated to the corresponding entries 22. In the table memory 20, one entry 22 is allocated to each of the segments in the segmented memory 10 and contains the memory address of a next entry 22 in the table memory 10. In this manner the entries 22 in the table memory 20 are linked to lists so that the lists of the entries 22 in the table memory 20 contain memory addresses of the lists 40 of segments in the segmented memory 10.

The lists of segments in the segmented memory 10 can be the lists 40 of descriptor segments 100 and data segments 200, by which a transmission unit is stored or a list of free segments in the segmented memory 10.

Access to the lists in the segmented memory is through list entry fields 40a, 40b.

Figure 4:
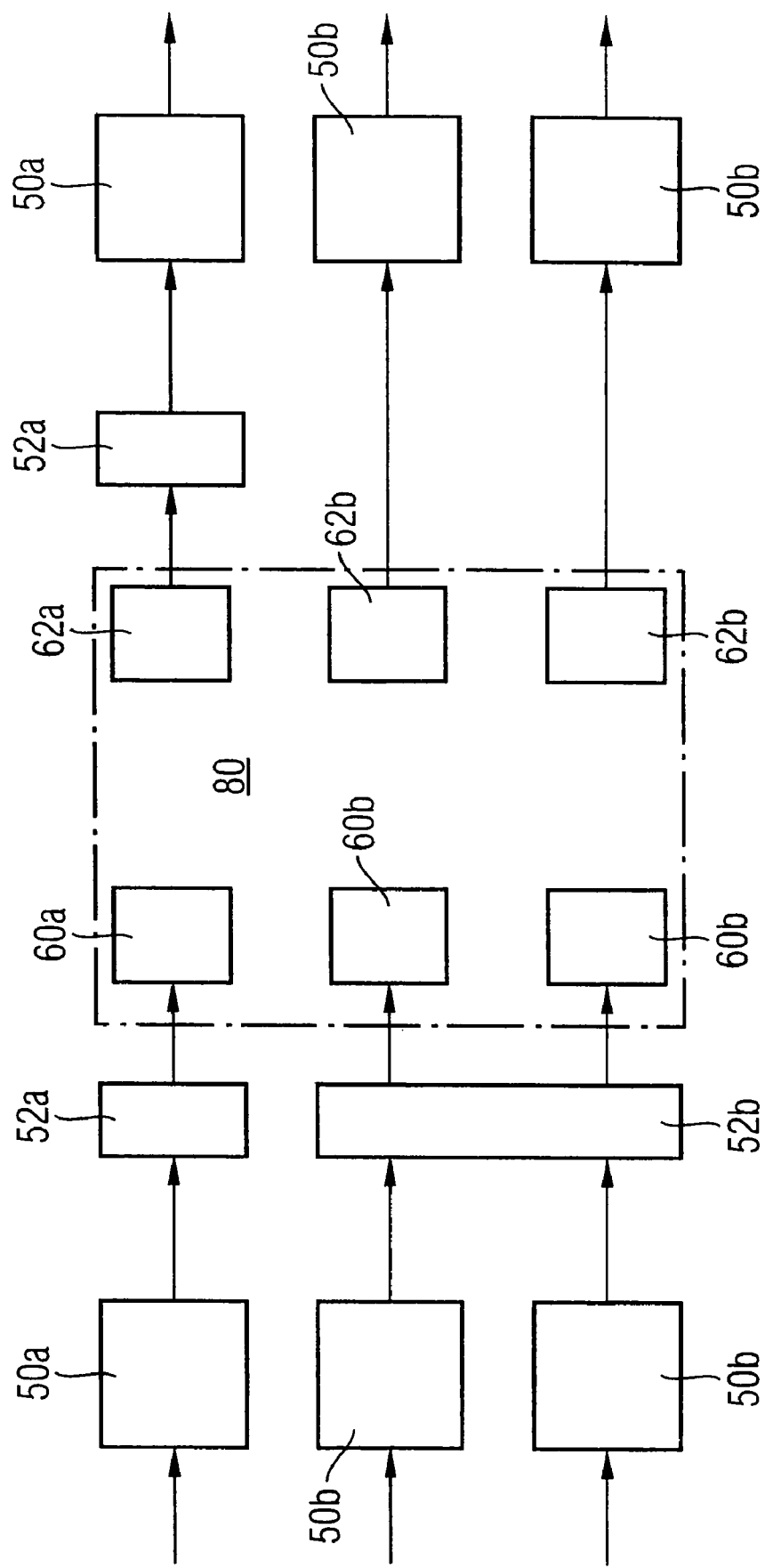
FIG. 4 is a schematic representation of the data flow in a network communications device for transferring data between an ATM network and an Ethernet network according to the embodiment of the present invention.

FIG. 4 is a schematic representation of the data flow in a network communications component according to the embodiment of the present invention. The network communication component is connected with the ATM network and the Ethernet network through interfacing means 50a, 50b. The interfacing means 50a, 50b are specifically a first bidirectional interface 50a to the ATM network and two further bidirectional interfaces 50b to the Ethernet network. The latter can be fast Ethernet interfaces or gigabit Ethernet interfaces.

Data received from the interfacing means 50a, 50b are converted into an internal format within the formatting blocks 52a 52b. The internal format uses units with a header section with a length of 16 bytes and a payload section with a length of 48 bytes. The formatting of transmission units that have been received from the Ethernet network differs from that of transmission units that are received from the ATM network and is therefore executed in a separate formatting block 52b. One input memory driver 60a, 60b in a processing block 80 is allocated to each of the interfacing means 50a, 50b. The processing block contains the segmented memory 10 and the memory drivers 60a, 60b undertake the storage of the data in the segmented memory 10. The transmission units are processed in the processing block 80. Transmission units whose processing has been completed are read out through output memory drivers 62a, 62b allocated to interfacing means 50a, 50b. Transfer to the interfacing means 50b to the Ethernet network occurs directly. In the case of the interfacing means 50a to the ATM network, an additional format conversion takes place in the formatting block 52a. The memory drivers 60a, 60b, 62a, 62b are DMA engines implemented at hardware level. In order to keep its manufacture and use as simple and effective as possible, the network communication component is integrated on a single semiconductor chip.

Figure 5:
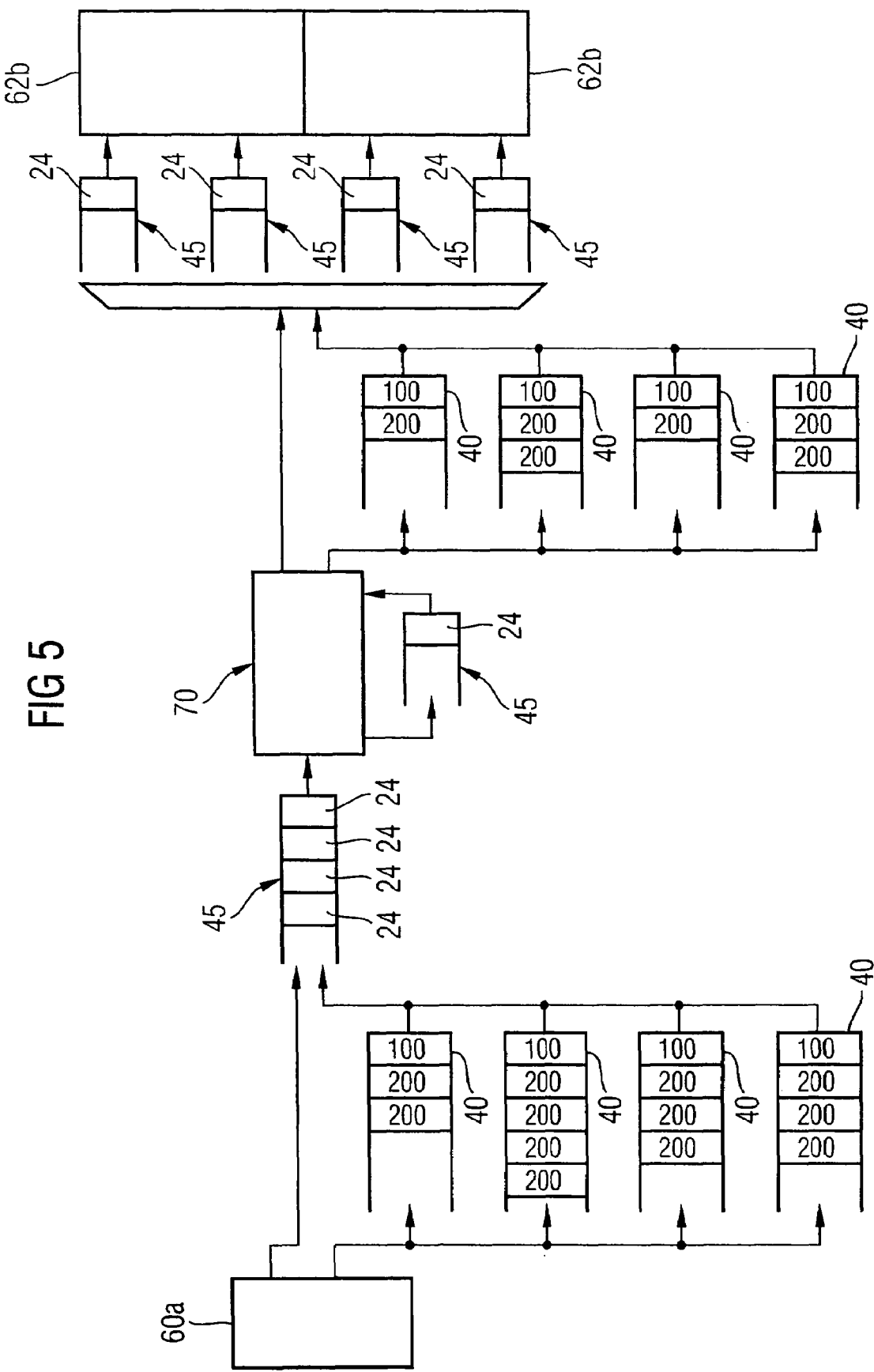
FIG. 5 shows the data flow from the ATM network to the Ethernet network in the network communication device according to the embodiment of the present invention.

FIG. 5 is a detail view of the data flow from the ATM network to the Ethernet network in the processing block 80. The data arrive at the input memory driver 60a in the internal format. The transmission units are stored in lists 40 made up of the descriptor segments 100 and the data segments 200. The storage and the compilation of transmission units containing Ethernet frames made up of several ATM cells, i.e. EoA transmission units occurs in input segment lists allocated for that purpose. Such a list 40 is released for processing when the EoA transmission unit assembled in it is complete, by passing the memory address 24 of the first descriptor segment 100 of the list 40 to a processing list 45 for incoming transmission units. For ATM cells which are destined to be encapsulated in an Ethernet frame, i.e. AoE transmission units the corresponding memory address 24 is directly passed to the processing list 45 for incoming transmission units.

The processing of the transmission units to adapt the data structure occurs sequentially through a special processing list 45 in a processing unit 70. During processing in particular the header sections of the transmission units are deleted, inserted or modified. This is done using the information held in the fields of the descriptor segment 100.

After processing has been competed the segments of the transmission units are assembled in output segment lists. Such a list 40 is released for output by passing the memory address 24 of the first descriptor element 100 of the list 40 to a processing list 45 for outgoing data. For the AoE transmission units the corresponding memory address 24 is directly passed to the processing list 45 for outgoing transmission units, without first being assembled in a list 40.

FIG. 6 shows the data flow from the Ethernet network to the ATM network in the processing block 80. In this case the EoA transmission units are Ethernet frames which are encapsulated into the AAL5 transmission units and the AoE transmission units are ATM cells encapsulated in Ethernet frames. The processing of the AoE transmission units and of the EoA transmission units happens basically in analogue fashion to the data flow explained under FIG. 5. However, it is not necessary to assemble the transmission units into output segment lists as the transmission units passed to the ATM network correspond to individual ATM cells.

The storage of transmission units for interworking described above, as described in the example of the network communication component, represents a particularly efficient solution. In particular, it facilitates efficient storage of the payload section of ATM cells, e.g. for reassembly within the AAL5 protocol, efficient storage of Ethernet frames with variable length, storage of complete ATM cells including header section and payload section, and flexible processing of the stored transmission units.

The invention claimed is:

1. A method of storing transmission units during a transfer of data between a first network and at least one further network, the method comprising:
   a) providing the data such that the data is contained in a payload section of the transmission units, and such that a payload section of each transmission unit of the first network has the same length;
   b) storing the transmission units in a segmented memory, wherein the segmented memory has a segmentation in which the length of a memory segment corresponds to the length of the payload section of the transmission units of the first network; and
   wherein step b) further comprises storing the transmission units in the segmented memory in the form of lists, each of the lists comprising at least one descriptor segment which describes a data structure of the corresponding transmission unit and at least one data segment, and
   wherein each descriptor segment comprises at least one field which defines a repeated execution of an operation on a plurality of data segments of the list of the corresponding transmission unit.

2. A method according to claim 1, wherein each memory segment of the segmented memory is addressable by a memory address.

3. A method according to claim 1, wherein information from a header section of the transmission units is stored in the corresponding descriptor segments.

4. A method according to claim 1, wherein a first element of each list is formed by the at least one descriptor segment.

5. A method according to claim 1, further comprising a step of inserting into the descriptor segments data defining a storage section in the corresponding transmission unit.

6. A method according to claim 1, wherein each of the descriptor segments comprises a field which describes a number of planned processing procedures of the corresponding transmission unit.

7. A method according to claim 1, wherein at least one descriptor segment describes a number of descriptor segments and data segments used to store the corresponding transmission unit in the segmented memory.

8. A method according to claim 1, wherein each of the descriptor segments has a field which describes a length of the corresponding transmission unit.

9. A method according to claim 1, wherein each of the descriptor segments has a field which describes a type of the corresponding transmission unit.

10. A method according to claim 1, wherein each memory segment of the segmented memory is addressable by a memory address and each descriptor segment has a field which contains the memory addresses of a data segment which is located at an end of the list of the corresponding transmission unit.

11. A method according to claim 1, wherein each descriptor segment comprises at least one field which defines a memory section in which one of the data segments of the list of the corresponding transmission unit is stored.

12. A method according to claim 1, wherein each descriptor segment comprises at least one field configured to receive data supplementing the corresponding transmission unit.

13. A method according to claim 1, wherein each descriptor segment comprises at least one field configured to receive data from a trailer section of the corresponding transmission unit.

14. A method according to claim 1, wherein each descriptor segment comprises at least one field which comprises a subfield which defines the function of the at least one field.

15. A method according to claim 1, wherein each descriptor segment has a number of fields, the number of fields being variable.

16. A method according to claim 15, wherein at least one descriptor segment comprises a field which marks the end of a sequence of fields which are used in the at least one descriptor segment.

17. A method according to claim 2, wherein the memory addresses of the memory segments are stored in a table memory, and wherein an entry in the table memory contains one memory address which points to a next entry in the table memory so that lists are formed which contain the memory addresses of the memory segments of the lists in the segmented memory.

18. A method according to claim 17, wherein one of the lists in the table memory contains the memory addresses of unused memory segments of the segmented memory.

19. A method according to claim 1, wherein the transmission units of the at least one further network have a data structure which differs from a data structure of the transmission units of the first network.

20. A method according to claim 1, wherein the first network comprises an ATM network and wherein the length of a memory segments is 48 bytes.

21. A method according to claim 1, wherein one of the further networks comprises an Ethernet network.

22. A method according to claim 1, wherein step b) further comprises storing transmission units in memory segments of the segmented memory which are linked to a list.

23. A network communications device for the transfer of data between a first network and at least one further network, the first network having a first form of transmission units and the at least one further network having a second form of transmission units, wherein a payload section of the first form of transmission units has a defined length, the network communications device comprising:
- a storage element configured to store transmission units to be processed, the storage element including a segmented memory having a segmentation, the segmentation defined such that a length of a segment of the segmented memory corresponds to the defined length of the payload section of the first form of transmission units;
- a processing element configured to adapt a data structure of the transmission units between the first form and the second form; and
- wherein the storage element is configured to store the transmission units in the segmented memory in the form of lists, each of the lists comprising at least one descriptor segment which describes a data structure of the corresponding transmission unit and at least one data segment, and wherein each descriptor segment comprises at least one field which defines a repeated execution of an operation on a plurality of data segments of the list of the corresponding transmission unit.

24. A network communications device according to claim 23, wherein the processing element is further configured to convert adapt the data structure of at least one transmission unit to an internal format that includes a header section and a payload section.

25. A network communications device according to claim 23, wherein the processing element is further configured to adapt the data structure of the transmission units such that transmission units pointers to segments of the segmented memory are moved and the payload section remains stationary in the segmented memory during the adapting.

26. A network communications device according to claim 25, wherein the segmented memory is addressable by memory addresses, and wherein the transmission units are stored in the segmented memory in the form of lists which comprise at least one first descriptor segment and at least one data segment.

27. A network communications device according to claim 23, wherein that the network communications device is in the form of an integrated network communications semiconductor component.

* * * * *